(12) United States Patent
Rudd

(10) Patent No.: US 7,255,171 B2
(45) Date of Patent: Aug. 14, 2007

(54) METHOD AND APPARATUS FOR MANUFACTURING AN EXPANDABLE SLOTTED TUBE

(75) Inventor: Wayne Rudd, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/181,294

(22) Filed: Jul. 14, 2005

(65) Prior Publication Data

US 2005/0247457 A1    Nov. 10, 2005

Related U.S. Application Data

(63) Continuation of application No. 10/453,740, filed on Jun. 3, 2003, now Pat. No. 6,938,694, which is a continuation of application No. 09/554,677, filed as application No. PCT/GB98/03478 on Nov. 19, 1998, now Pat. No. 6,571,672.

(30) Foreign Application Priority Data

Nov. 19, 1997    (GB) .................................. 9724335.6

(51) Int. Cl.
 *E21B 29/00*   (2006.01)
 *B26F 1/00*   (2006.01)
 *B23P 13/00*   (2006.01)
(52) U.S. Cl. ..................... 166/297; 166/55.2; 166/206; 166/207; 83/36; 83/54; 29/407.05; 29/557; 29/896.6
(58) Field of Classification Search ................ 166/297, 166/207, 206, 552; 83/36, 74, 54; 29/407.05, 29/557, 896.6
See application file for complete search history.

(56) References Cited

U.S. PATENT DOCUMENTS

| 1,731,930 | A | | 10/1929 | McCullough et al. | |
|---|---|---|---|---|---|
| 1,760,075 | A | * | 5/1930 | McCullough et al. | ........ 409/203 |
| 3,370,491 | A | * | 2/1968 | Cross | ........................... 83/37 |
| 3,545,336 | A | * | 12/1970 | Savko | ........................ 409/157 |
| 3,768,365 | A | * | 10/1973 | Howe | ........................ 409/203 |
| 3,821,912 | A | * | 7/1974 | Howe | ............................ 83/54 |
| 3,831,470 | A | * | 8/1974 | Maroschak | .................... 83/39 |
| 3,843,758 | A | * | 10/1974 | Maroschak | ................ 264/40.7 |
| 4,358,978 | A | | 11/1982 | Lawson | |

(Continued)

FOREIGN PATENT DOCUMENTS

DE    3213464    10/1983

(Continued)

*Primary Examiner*—David Bagnell
*Assistant Examiner*—Shane Bomar
(74) *Attorney, Agent, or Firm*—Patterson & Sheridan, L.L.P.

(57) ABSTRACT

A method of manufacturing an expandable slotted tube fabricated from at least one tubular element and at least two annular elements connected to the opposite ends of the tubular element by means of butt joints wherein axially extending slots are formed at a uniform angular spacing around the periphery of the tube and in longitudinally overlapping relation characterized by cutting said annular elements in a pattern of overlapping positionally fixed slots in accordance with invariable parameters which are predetermined relative to the dimensions of said annular elements and cutting in said tubular element a pattern of slots that is variable in accordance with measured parameters of the tube so as to achieve the required overlap between said positionally fixed and variable slots. A machine for carrying out the method is also described.

25 Claims, 6 Drawing Sheets

U.S. PATENT DOCUMENTS

| | | | |
|---|---|---|---|
| 5,924,745 A * | 7/1999 | Campbell | 285/90 |
| 5,953,974 A * | 9/1999 | Hegler et al. | 83/206 |
| 5,984,568 A * | 11/1999 | Lohbeck | 403/375 |
| 6,065,500 A * | 5/2000 | Metcalfe | 138/118 |
| 6,273,634 B1 * | 8/2001 | Lohbeck | 403/297 |
| 6,315,040 B1 * | 11/2001 | Donnelly | 166/207 |
| 6,322,109 B1 * | 11/2001 | Campbell et al. | 285/92 |
| 6,354,373 B1 * | 3/2002 | Vercaemer et al. | 166/277 |
| 6,454,013 B1 * | 9/2002 | Metcalfe | 166/382 |
| 6,454,493 B1 * | 9/2002 | Lohbeck | 405/184.2 |
| 6,571,672 B1 | 6/2003 | Rudd | |
| 6,686,890 B2 * | 2/2004 | James et al. | 343/770 |

FOREIGN PATENT DOCUMENTS

| | | |
|---|---|---|
| DE | 4133802 | 10/1991 |
| DE | 4219431 | 1/1994 |
| WO | WO 96/25800 | 12/1993 |
| WO | WO 96/37680 | 11/1996 |
| WO | WO 97/21901 | 6/1997 |
| WO | WO 97/28920 | 8/1997 |
| WO | WO 99/18328 | 4/1999 |
| WO | WO 99/23354 | 5/1999 |
| WO | WO 99/25524 | 5/1999 |

* cited by examiner

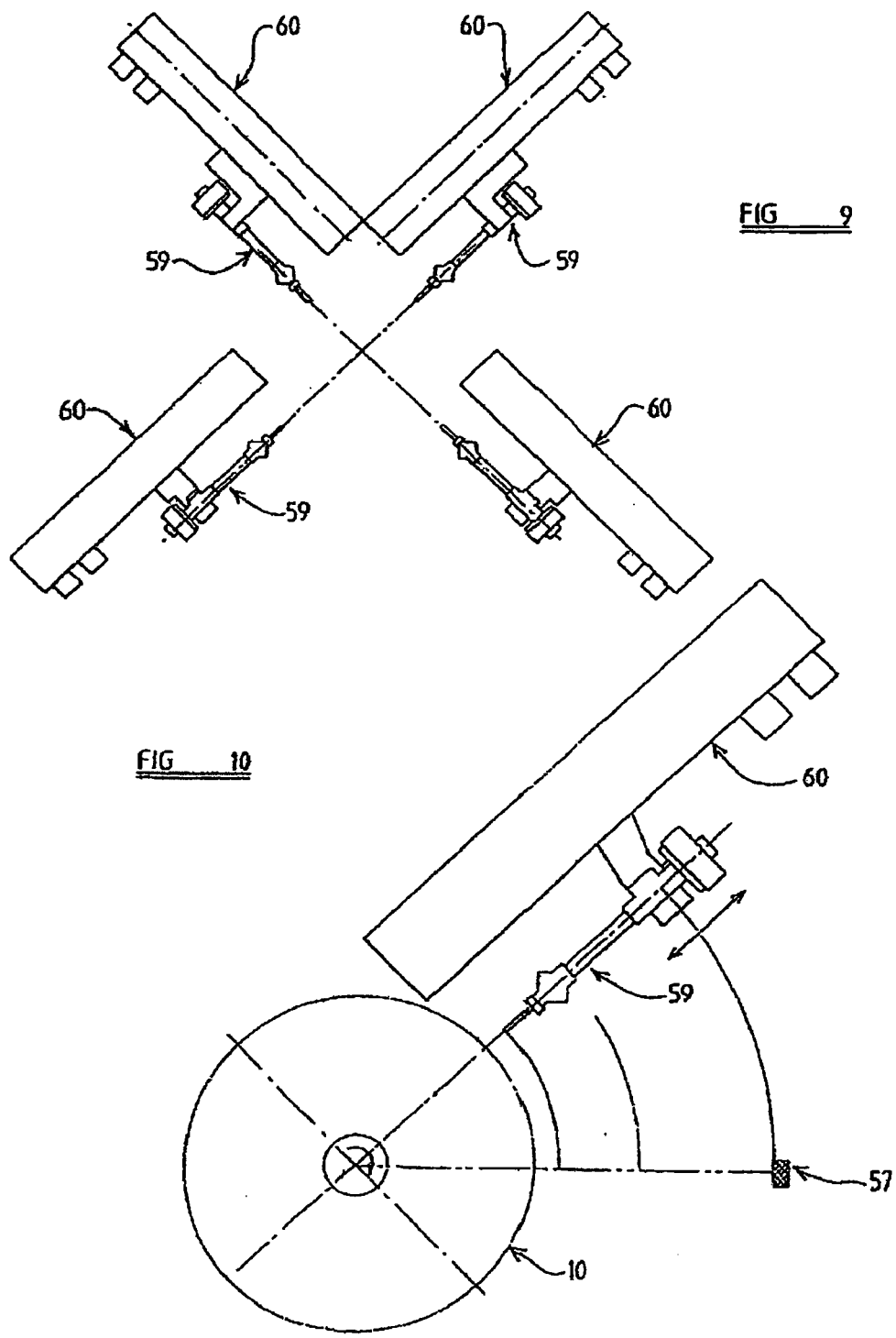

METHOD AND APPARATUS FOR MANUFACTURING AN EXPANDABLE SLOTTED TUBE

This application is a continuation of U.S. patent application Ser. No. 10/453,740 filed on Jun. 3, 2003, now U.S. Pat. No. 6,938,694, which is a continuation of U.S. patent application Ser. No. 09/554,677 filed on May 17, 2000, now U.S. Pat. No. 6,571,672, which is the National Stage of International Application No. PCT/GB98/03478, filed on Nov. 19, 1998 and which designated the U.S. and published under PCT Article 21(2) in English, and claims priority of United Kingdom Application No. 97245335.6, filed on Nov. 19, 1997. The aforementioned patent applications are hereby incorporated by reference.

BACKGROUND OF THE INVENTION

Description of Invention

This invention relates to expandable slotted tube which is used primarily in bore holes to form a lining which prevents collapse of the wall of the bore hole whilst allowing substantially unrestricted flow of fluids from the surrounding strata into the bore hole.

The use of such expandable slotted tube is described particularly in WO-A-93/25800. The expandable slotted tube (or "liner" as it is referred to therein) is a product which can with advantage be used in all aspects of well life, including drilling, completion, well intervention and abandonment. Conventional oil field technology is based on inserting articles of fixed size into the well bore, and well construction is normally such that the size of the bore progressively reduces from the well head down to the reservoir to be tapped. This can lead to an unworkably small bore size at the required depth, leading to compromises in well operability or, in an extreme case, resulting in failure to reach the reservoir at a bore size sufficient to enable the reserves to be exploited.

The use of expandable slotted tube provides flexibility to cope with unexpected problems during both drilling and completion of the well and also during the life of the well as compared with conventional well construction techniques.

In particular, expandable slotted tube can be designed to fit most well bore sizes, whilst being made small enough to pass through pre-existing restrictions in the bore. This is largely as a result of the phenomenon known as "surplus expansion" which occurs when the expandable slotted tube is expanded by drawing an expansion mandrel through it, that is to say the expanded internal diameter of the tube increases to a value greater than that of the maximum outside diameter of the expansion mandrel by a factor which is depending at least in part on the mandrel design.

The expandable slotted tube as described in WO-A-93/25800 can be expanded up to 200% of its original diameter and can in theory be made in any size or length.

However, there are problems in the manufacture of such expandable slotted tube, and in particular in ensuring uniform radial expansion.

In practice, the tube in which the slots have to be formed will, in general, not be accurately cylindrical and straight over the whole of its length. The longitudinal axis of the tube may deviate from a straight line over all or part of its length, and the circumferential shape of the tube may deviate form accurately circular over part or all of its length, due to limitations inherent in the manufacturing processes conventionally employed. As a result, if a predetermined and invariable pattern of slots is cut into such a tube such defects will be magnified by its subsequent radial expansion and may then exceed acceptable tolerances.

Moreover, in practice, such tubes must be joined together to form a liner of the required overall working length corresponding to the depth of the borehole. Accordingly, appropriate coupling fittings must be provided at opposite ends of each tube to form a composite fabrication comprising a tubular element of appropriate length and annular elements forming the coupling fittings at the ends thereof.

Further, each length of such fabricated tube may include one or more additional fittings intermediate its ends, known as "landing rings", which are also formed as separate components, the tube then comprising two (or more) of said tubular elements connected together in end-wise relation by an annular element formed as a landing ring, and the two annular elements forming the end coupling fittings.

Thus, typically, a length of tube as fabricated may comprise at least five elements, namely a female end coupling at one end, a first tubular element, a landing ring, a second tubular element, and a male end coupling at the other end. The couplings and landing ring are fittings that are normally formed to a high degree of accuracy by machining operations, and these fittings necessarily have different characteristics from the tubular elements. However, the individual components are secured together in endwise relation by means such as welding, and the fabrication of the complete tube in this way inevitably introduces variability in a number of respects from one tube to another, even though nominally identical.

In particular, the overall length of the fabricated tube, which is typically in excess of 10 meters, may vary by several millimeters as a result of the accumulated tolerances on the lengths of the individual tubular elements and the thickness of each weld. Additionally, as a result of potential distortions within each tubular element, the couplings at opposite ends of the tube will in general not be accurately in register with one another circumferentially, that is to say one may be angularly offset relative to the other about the centreline of the tube. This is of significance since the couplings are normally formed with axially interfitting formations, and the slots which are formed in the tube must be correctly orientated relative to such interfitting formations at both ends of the tube.

Additionally, the accuracy, with respect to location and length, of the slots which extend across locally thickened portions of the tube, for example in the landing rings and end couplings, is critical.

Accordingly the object of the invention is to facilitate the manufacture of expanded slotted tube in a manner which satisfactorily takes such factors into account.

According to the invention we provide a method of manufacturing an expandable slotted tube of a kind which is fabricated from at least one tubular element formed by extrusion or similar processes and at least two annular elements formed by machining or like processes and connected to the opposite ends of the tubular element by means of butt joints formed by welding or like processes, wherein axially extending slots are formed at a uniform angular spacing around the periphery of the tube fabricated from said elements and in longitudinally overlapping relation throughout the entire length of said fabricated tube, including said tubular element and said annular elements, the method being characterized by cutting in said annular elements a pattern of overlapping positionally fixed slots in accordance with fixed and invariable parameters with regard to their longitudinal position and length which are predetermined relative to the dimensions of said annular elements, and cutting in said tubular element a pattern of positionally variable slots that is variable with regard to at least the parameters of longitudinal position and length of the slots in accordance with measured parameters of the fabricated tube so as to achieve the required overlap between said positionally fixed slots and said positionally variable slots.

The method may include the steps of a) establishing longitudinal datum points for each of said annular elements, b) calculating, by reference to said longitudinal datum points and by reference to the pre-determined parameters of longitudinal position and axial length of said positionally fixed slots, the nominal longitudinal position and axial length of said positionally variable slots required to be cut in said tubular element so as to ensure that those positionally variable slots that extend across a joint between said annular elements and said tubular element are longitudinally centered on the joint across which they extend, and the length of each overlap between said positionally variable slots, including said joint-crossing slots, is uniform, and c) cutting said slots in accordance with said pre-determined and said calculated parameters.

The method also preferably includes the further step of monitoring at the cutting site the position of the local center-line of the tube and the radial distance from said center-line to the outer surface of the tube, and recalculating the nominal parameters of the positionally variable slots so as to correct substantially uniformly over the length of the tubular element for any local deviations in the position of the center-line and/or in circularity of the tubular element.

The method is preferably carried out by commencing the cutting of said slots from one end of the fabricated tube to form said slots progressively along the entire length of the tube.

The longitudinal datum points may include a first point corresponding to a first end of the tube as defined by an end face of the annular element at that end of the tube and a second point corresponding to the other end of the tube as defined by an end face of the annular element at the end of the tube, plus third and fourth points corresponding respectively to the joints between the tubular element and the annular elements at those ends of the tube. It will be appreciated that the annular elements at those end of the tube may comprise couplings for the releasable connection of two similar tubes, in particular male and female couplings which are adapted to fit at least partially one inside the other and accordingly are in part of greater external diameter than the tubular element to which they are joined.

Normally, the fabricated tube will also include a further such annular element which is disposed intermediate the ends of the tube, which then comprises two of said tubular elements, such intermediate annular element being connected thereto by butt joints. Such intermediate annular element may be formed with an external flange for the purpose of lifting the fabricated tube, and therefore also be of greater external diameter than the tubular element to which it is joined. In such a case the datum point for this intermediate annular element may be afforded by a radial face of the flange. The method previously described may accordingly be applied to the manufacture of slotted tube of the kind which the tubular element has a further tubular element connected thereto by means of one of said annular elements and said further tubular element has a further annular element connected at the end thereof, and the annular element which is disposed intermediate the tubular elements is formed with in an external flange, by establishing a further datum point corresponding to a radial face of the flange on said intermediate annular element.

In accordance with a preferred feature of the invention an angular datum is also established relative to the center-line of the fabricated tube at one end thereof, and cutting is commenced at the other end so that any angular off-set which is required at the latter end to align the slots correctly with respect to the annular element at that end is determined relative to said angular datum and is included in the re-calculation of the parameters of said positionally variable slots. The angular position of the positionally fixed slots may also be included in this re-calculation.

According to a further aspect of the invention also resides in expandable slotted tube as manufactured by the above method.

Further, the invention also resides in a machine for use in the manufacture by the above method of expandable slotted tube of a kind which is fabricated from at least one tubular element formed by extrusion or similar processes and at least two annular elements formed by machining or like processes and connected to the opposite ends of the tubular element by means of butt joints formed at a uniform angular spacing around the periphery of the tube fabricated from said elements and in longitudinally overlapping relation throughout the entire length thereof, including said tubular element and said annular elements, and comprising a) means for establishing longitudinal datum points for each of said annular elements, b) means for calculating, by reference to said longitudinal datum points and to the pre-determined parameters of longitudinal position and axial length of said positionally fixed slots, the nominal longitudinal position and axial length of said positionally variable slots required to be cut in said tubular element so as to ensure that those positionally variable slots (hereinafter called "joint-crossing" slots) that extend across a joint between said annular elements and said tubular element are longitudinally centered on the joint across which they extend, and the length of each overlap between said positionally variable-slots, including said joint-crossing slots, is uniform, and c) means for cutting said slots in accordance with said pre-determined and calculated parameters.

The cutting means is preferably arranged to cut said slots progressively from one end of the fabricated tube to form said slots sequentially along the entire length of the tube.

The machine also preferably includes means for monitoring the position of the local center-line of the tube and the radial distance of the outer surface of the tube at the cutting site from said center-line, and recalculating the nominal parameters of the positionally variable slots so as to correct substantially uniformly over the length of the tubular element for any local deviations in the position of the center-line and/or in circularity of the tubular element as the cutting progresses along the tubular element.

Such machine preferably also includes means for establishing an angular datum relative to the center-line of the fabricated tube at one end thereof, means for providing an angular off-set relative to said angular datum of said cutting means at the other end of the tube to align the slots correctly with respect to the annular element at the end, and means for including said angular off-set in the re-calculation of the parameters of said positionally variable slots as cutting progresses.

The machine may comprise a plurality of supports adapted to hold a fabricated tube for cutting, an indexing rotator connectable to said tube for rotating said tube about its longitudinal axis in step-wise increments, a longitudinal guide defining a first longitudinal axis parallel to that of said tube when mounted on said supports, a main carriage mounted on said longitudinal guide for movement along said first longitudinal axis and along the entire length of said tube, a sub-carriage mounted on said main carriage for movement relative thereto on two transverse axes relative to said longitudinal axis of the tube so that said sub-carriage can thereby be centered relative to said longitudinal axis of the tube and for movement on a second longitudinal axis which is parallel to said first longitudinal axis, at least one slot cutter mounted on said sub-carriage for movement radially relative to said longitudinal axis of the tube, and a control system operative to move said main carriage through a succession of working positions along the longitudinal guide, in each of which positions the sub-carriage is centered relative to said longitudinal axis of the tube and a sequence of slot cutting operations is performed by moving said sub-carriage along said second longitudinal axis while said slot cutter is operated to cut a slot of pre-determined length, rotationally indexing said tube and returning said sub-carriage to its starting position on said second longitudinal axis and repeating the cutting operations until all the required slots are formed at each of said working positions.

Preferably, the machine includes a plurality, e.g. four, of said slot cutters which are arranged at equal spacings around longitudinal axis of the tube so that a plurality of slots can be cut simultaneously each time the tube is indexed. The slot cutters are preferably abrasive water-jet cutters, although other types of cutter could be employed.

These and other aspects of the invention will now be described by way of example with reference to the accompanying drawings wherein:

FIG. 9 illustrates in more detail the arrangement of cutter jets incorporated in the machine; and FIG. 10 illustrates the arrangement of one of several probes incorporated in the machine.

Figure 1:
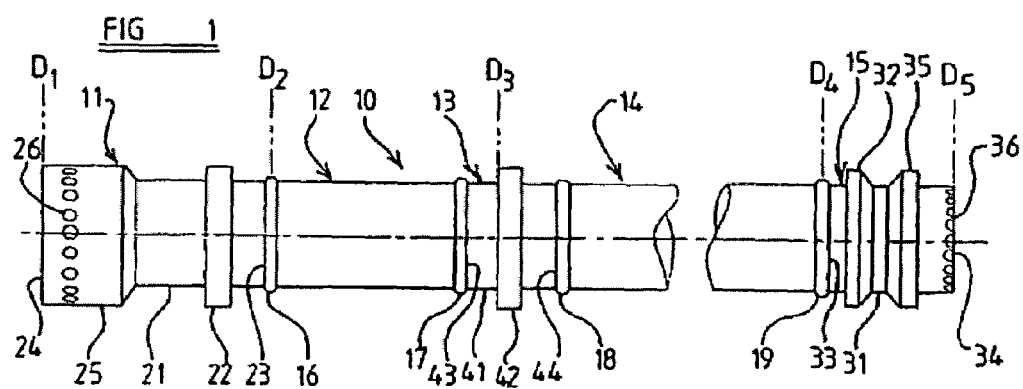
FIG. 1 is a diagrammatic illustration of a typical fabricated tube prior to slotting.

As shown in FIG. 1, a fabricated tube 10 of the kind to which the present invention is applied comprises an end fitting 11 serving as a female coupling, a shorter tubular element 12, a landing ring 13, a longer tubular element 14, and a further end fitting 15 serving as a male coupling. The end fittings 11 and 15, and the landing ring 13, are each formed as machined components of accurately determined length, diameter and circularity etc., but the tubular elements 12 and 14 are conventionally formed by extrusion and generally will not be truly straight throughout their lengths, and may not be truly cylindrical in shape at all points along their lengths, and indeed the tolerance on wall thickness and outside diameter may be significantly greater than that which is applicable to the machined components. The five components are secured together endwise by butt welding to form joints as shown in 16, 17, 18 and 19, and the thickness of each butt weld is somewhat variable with the result that the overall length of the tube 10 as fabricated may vary from the nominal value by several millimeters, in a total length which in many cases will exceed 10 meters. Typically, the outside diameter of the tubular elements may be between approximately 10 and 40 cm.

The female coupling 11 includes a body portion 21 of the same nominal diameter and wall thickness as the adjacent tubular element 12, with an external flange 22 near the end 23 at which it is welded to tubular element 12. The flange 22 divides the body portion 21 into outer and inner sections 21a and 21b respectively. At the opposite end 24 the female coupling 11 is formed with a widened end portion 25 which is formed with internal circumferentially extending serrations (not shown) and with a plurality of circumferentially spaced holes 26 which are adapted to receive locking plungers (not shown) for the purpose of locking in place the complementary male coupling 15 which is provided at the other end of a similar tube to which the tube 10 will, in use, be connected.

The male coupling 15 similarly includes a body portion 31 which is also of the same nominal diameter and wall thickness as the adjacent tubular element 14, and is formed with a first external flange 32 at a position spaced from the end 33 at which it is welded to the adjacent tubular element 14, and a second external flange 35 spaced from the opposite end 34. The flanges 32 and 35 divide the body portion 31 into outer, middle and inner sections 31a, 31b and 31c respectively. Adjacent the end 34 the male coupling 15 is formed with external circumferentially extending serrations (not shown) which are adapted to mate with the internal serrations of a female coupling 11 when two such tubes 10 are joined together. A plurality of circumferentially spaced recesses 36 are formed in the outer end 34 and arranged to receive the locking plungers previously mentioned so as to prevent relative rotation of two tubes 10 when joined together.

The landing ring 13 comprises a cylindrical body 41 having an external flange 42 at a position intermediate the ends 43, 44 whereby it is welded to the adjacent tubular elements 12 and 14 respectively. The flange 42 divides the body 41 into first and second portions 41a and 41b respectively.

Figure 2:
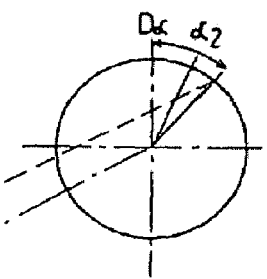
FIG. 2 is a diagrammatic illustration of the way in which the male and female couplings at opposite ends of the tube may be angularly offset relative to one another.
Figure 2:
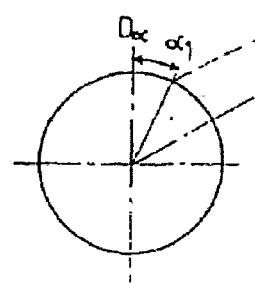

FIG. 2 is a diagrammatic illustration of the way in which the male and female couplings at opposite ends of the tube 12 may be angularly offset relative to one another as a result of distortions and/or inaccuracies in the welding of the various components during the fabrication of the tube. Thus, a specific locking plunger in the female coupling 11 may be angularly offset from an angular datum point $D_\alpha$ by an angle $\alpha_1$ which differs, positively or negatively, from the angle $\alpha_2$ at which the corresponding recess 36 is offset from the datum $D_\alpha$ at the male coupling end of the tube.

To enable the entire tube 10 to be expanded uniformly throughout its length a series of longitudinally extending overlapping slots requires to be cut through the entire wall thickness of the tube throughout its entire length.

In cutting the required pattern of slots, account has to be taken of variations arising from the fact that the tubular elements 12 and 14 may not be truly straight or circular in section and may not be cut to precisely controlled lengths, the fact that there may be variations in the dimensional layout of each joint as a result of manufacturing tolerances in the extrusion of the tubular elements and in the butt welding operations, the fact that slot widths need to be maintained constant despite potentially differing wall thicknesses at different points along the length of the tube, and the fact that there may be angular misalignment between the opposite ends of the tube.

Figure 3:
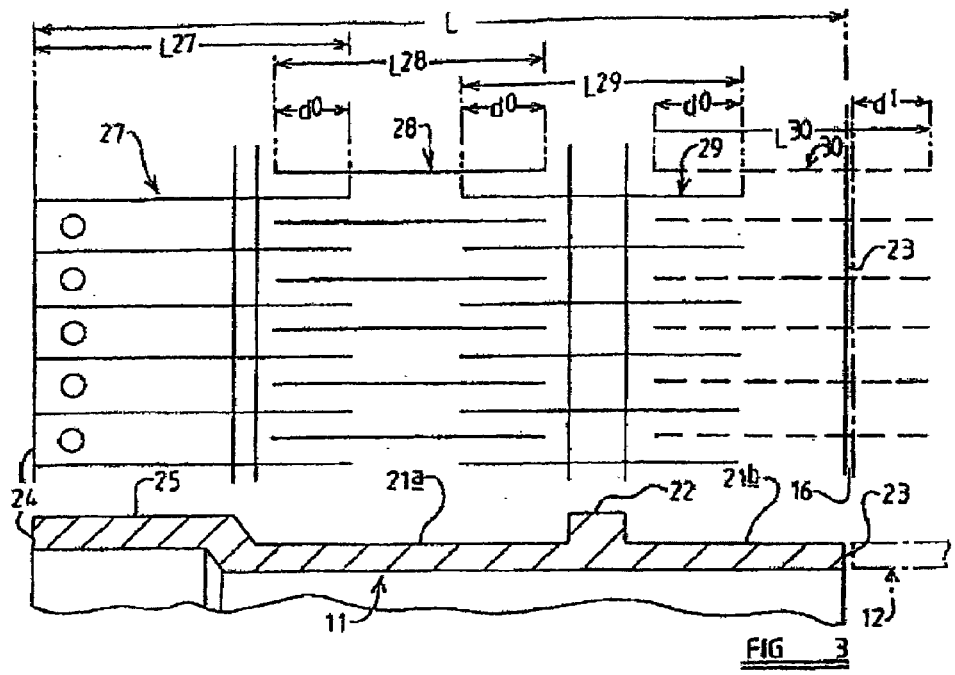
FIG. 3 illustrates diagrammatically a section through a female connector at one end of the fabricated tube and a developed view of the slot pattern which requires to be cut.

Because the overall length L of the female connector 11, which is made by a machining operation, is known to a high degree of accuracy, the required slot pattern as shown in FIG. 3 is essentially pre-determined by the dimensions of this component.

In the example illustrated in FIG. 3, the female connector 11 is formed with three rows of overlapping slots 27, 28, 29. The slots 27 are required to extend from outer end 24, across the widened end portion 25 and into the outer section 21a; the slots 28 are required to extend wholly within the outer section 21a; and the slots 29 are required to extend from the outer section 21a, across the flange 22 and into the inner section 21b of the body portion 21. To achieve uniform expansion despite the varying geometry of the component, it is required that the slots overlap uniformly by a distance $\underline{d}^0$ and that the slots 29 are longitudinally centered on the flange 22. Because the dimensions of the female coupling 11 are accurately controlled during manufacture, the lengths $L^{27}$, $L^{28}$ and $L^{29}$ of the slots 27, 28 and 29 respectively, and their circumferential spacing can be regarded as essentially predetermined and invariable for any given coupling and these slots are accordingly positionally fixed. Their overlap $\underline{d}^0$ is also predetermined for any specific nominal length of fabricated tube 10.

The next row of slots 30 which are required to extend across the joint 16 and into the adjacent tubular element 12 may also be of a predetermined length $L^{30}$ and have the same overlap $\underline{d}^0$ with slots 29. However, since the thickness of the weld forming the joint 16 cannot be closely controlled, the distance $d^1$ between the end of the tubular element 12 and the ends of the slots 30 is indeterminate.

In a similar manner, the slot pattern required in the male connector 15 includes three rows of overlapping slots 37, 38, 39. The slots 37 are required to extend form the outer end 34, across the outer section 31a and the flange 35 and into the middle section 31b; the slots 38 are required to extend wholly within the middle section 31b; and the slots 39 are required to extend from the middle section 31b, across the flange 32 and into the inner section 31c of the body portion 31. To achieve uniform expansion despite the varying geometry of the component, it is again required that the slots overlap uniformly by a distance $\underline{d}^0$ and that the slots 39 are longitudinally centered on the flange 32. Because the dimensions of the male coupling 15 are accurately controlled during manufacture, the lengths $L^{37}$, $L^{38}$ and $L^{39}$ of the slots 37, 38 and 39 respectively, and their circumferential spacing can be regarded as essentially predetermined and invariable for any given coupling and these slots are accordingly positionally fixed. Their overlap $\underline{d}_0$ is also predetermined for any specific nominal length of fabricated tube 10.

The next row of slots 40 which are required to extend across the joint 19 and into the adjacent tubular element 14 may also be of a predetermined length $L^{40}$ and have the same overlap $d^0$ with slots 39. However, since the thickness of the weld forming the joint 19 cannot be closely controlled, the distance $d^2$ between the end of the tubular element 14 and the ends of the slots 40 is indeterminate.

Figure 4:
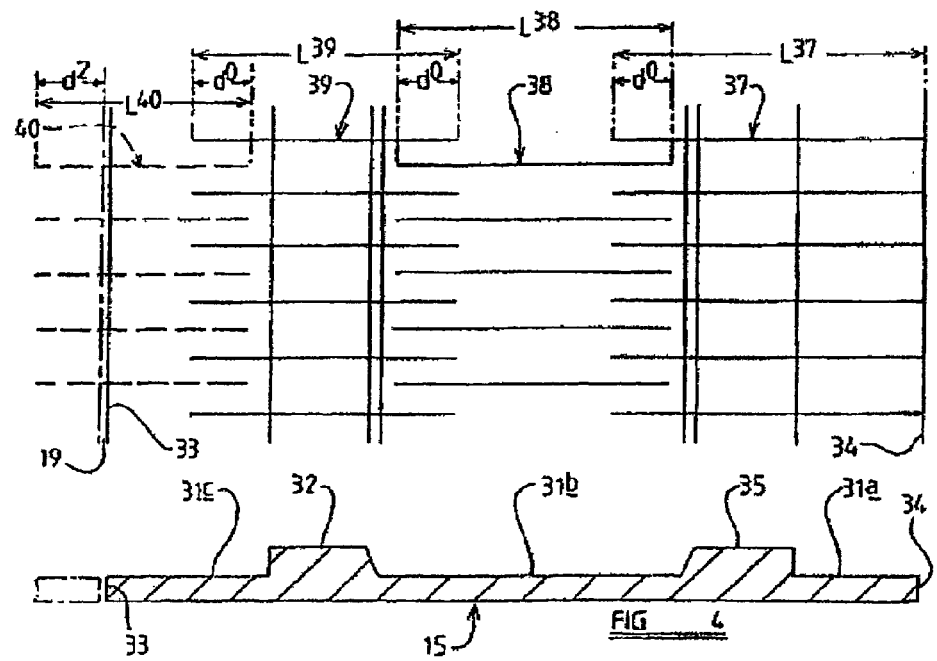
FIG. 4 shows, in a manner similar to FIG. 3, the required slot pattern in a male connector at the other end of the fabricated tube.
Figure 5:
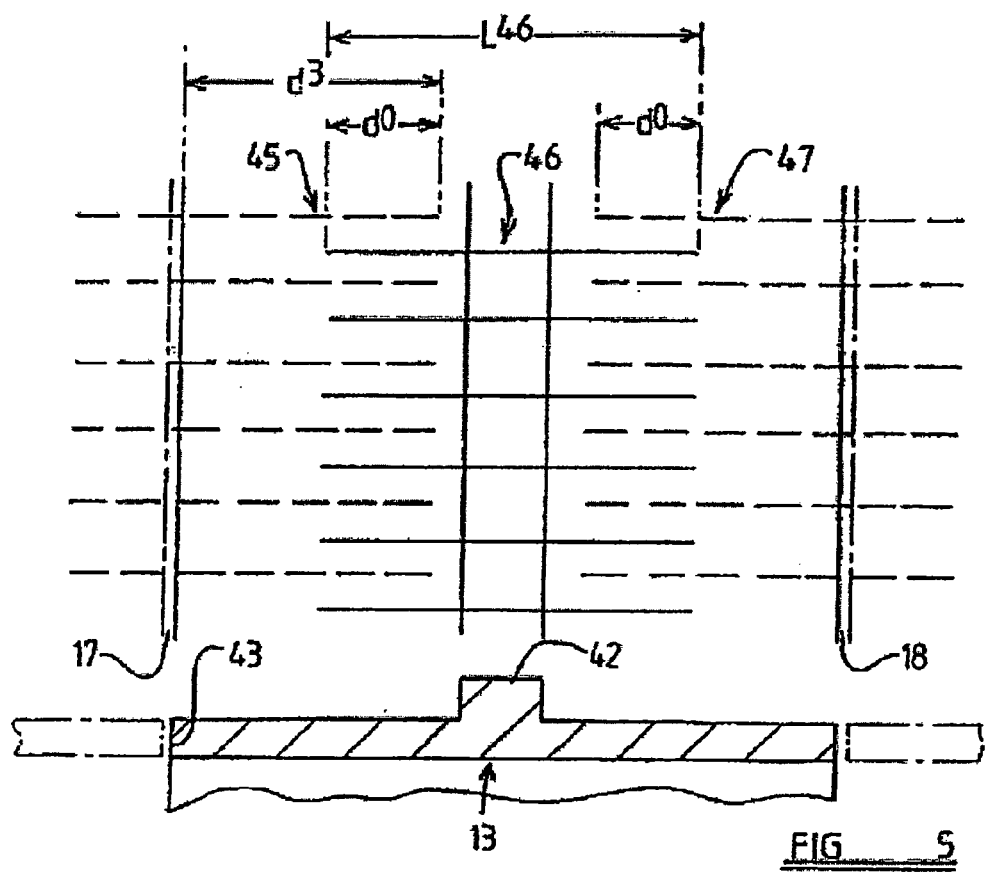
FIG. 5 shows, in a manner similar to FIG. 3, the required slot pattern in a landing ring inserted at a position intermediate the ends of the tube.
Figure 6:
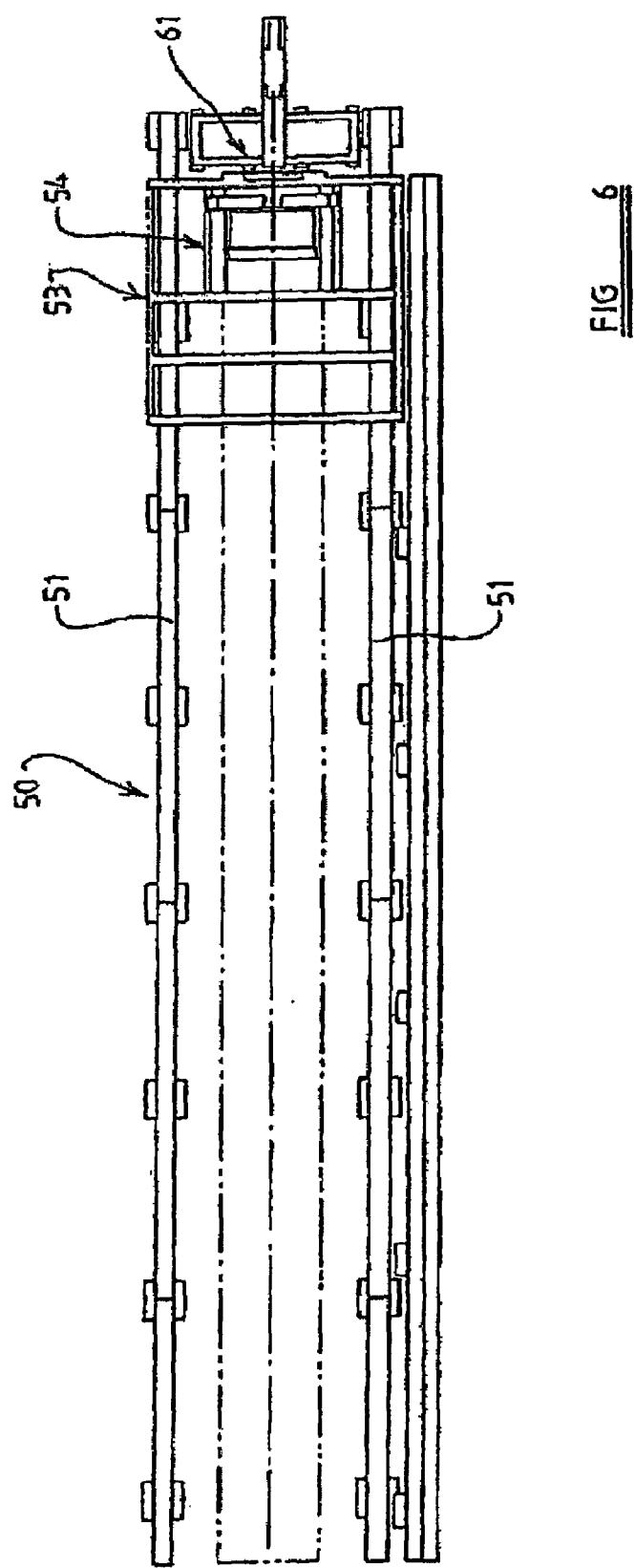
FIG. 6 is a plan view of a machine in accordance with the invention for cutting the required slots in the tube shown in FIG. 1.
Figure 7:
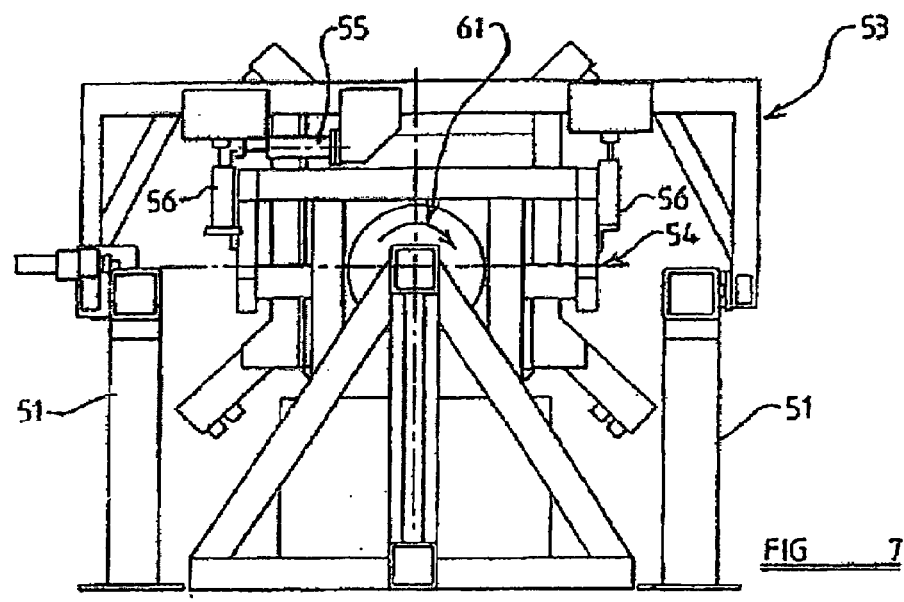
FIG. 7 is an end view of the machine.
Figure 8:
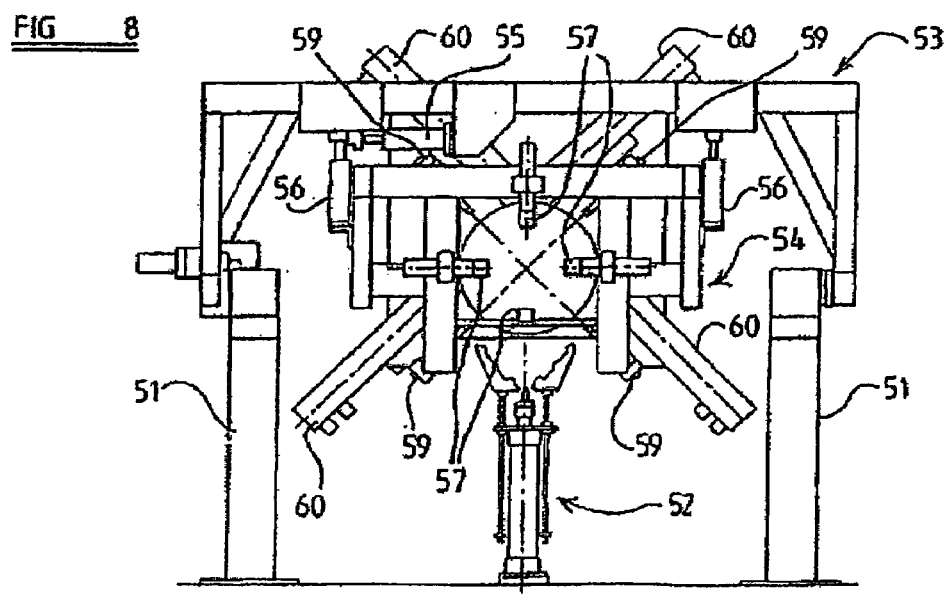
FIG. 8 is a view of a carriage assembly in the same direction as that of FIG. 7.

The slots 46, to be formed in the landing ring 13, which is likewise a machined component, have a predetermined length $L^{46}$ and must be centered on the flange 42 as illustrated in FIG. 4. The adjacent slots 45 and 47 which extend from the sections 41a and 41b respectively and over the joints 17 and 18 are required to overlap the slots 46 by the predetermined distance $\underline{d}^0$ at each end. However, because of the indeterminate thickness of the welds forming the joints 16 and 17, if an invariable slot pattern is followed along the length of the tubular element 12 the distance $d^3$ of the ends of the slots 45 from the end 43 of the landing ring 13 will also be indeterminate, with the result that the length of the overlap with slots 46 will be indeterminate.

This, in accordance with the invention, the slots which are formed in the tubular element 12, including the joint-crossing slots 30 and 45 and all those between these slots, are not cut to a strictly predetermined pattern, but instead are variable in position and length so as to accommodate the variations which will occur between different tubes 10 of the distance between the end 24 of the female connector 11 and the end 43 of the landing ring 13. In this way, by varying the length of the slots cut in tubular element 12 in accordance with the measured parameters of the tube 10 undergoing cutting, the requirement constant overlap $\underline{d}^0$ between the slots from slots 30 up to and including slots 45 can be maintained. In a similar manner the slots to be formed in the tubular element 14, including slots joint-crossing slots 47 and 40, are likewise of variable length to ensure that the required predetermined overlap $\underline{d}^0$ is maintained throughout the remaining length of the tube 10 despite the variable thickness of the welds 18 and 19.

In addition, because the tubular elements 12, 14 may not be accurately round, or indeed of non-varying diameter along their lengths, and because of the possible angular offset between opposite ends of the tube, adjustments are made to the slot pattern in the tubular elements 12, 14 to accommodate such variations as are determined to exist in the tube being cut.

These adjustments are achieved in accordance with the invention by determining certain datum points on the tube and re-computing the lengths of the positionally variable slots to ensure the required overlap with each other and with the positionally fixed slots, and monitoring deviations in circularity and centreline along at least the lengths of tubular elements 12, 14 and making appropriate compensatory corrections in order to maintain an optimum pattern of slots for the purpose of achieving uniform expansion.

As shown in FIGS. 6–10, the machine 50 in accordance with the invention for cutting the required pattern of slots in the tube 10 includes a pair of parallel steel frames 51 each carrying a precision rail and defining a longitudinal axis for the movement of a main carriage 53 over the entire length of the tube 10 which is supported along its length on variable height roller assemblies 52 which are fitted to pneumatic cylinders so that they can be pulled down individually as the main carriage 53 travels along the length of the tube 10. For this purpose, the main carriage 53 carries an electric motor which drives a pinion meshing with a rack adjacent to one of the rails.

The main carriage 53 supports a sub-carriage 54 in such a way that it is self-centering with respect to tube 10. For this purpose the sub-carriage 54 is movable transversely relative to the main carriage by means of an actuator 55, and vertically by means of actuators 56. The sub-carriage 54 carries four probes 57 arranged respectively above, below and on each side of the longitudinal centreline of the tube. The probes may include feelers which have mechanical contact with the external surface of the tube, but preferably are of a contactless type, in particular a laser probe which determines the spacing between the probe and the surface of tube. Data from these probes is used to control the actuators 55 and 56 so that the carriage can be centered onto the tube 10 prior to the commencement of the cutting of each row of slots.

The sub-carriage 54 is also movable relative to the main carriage in a direction longitudinally of the tube by means of a high precision ballscrew (not shown).

The sub-carriage 54 also carries fourwater-jet cutters 59 mounted concentrically around the tube centreline at 45° to the vertical so as to surround the tube. The cutters are individually movable towards and away from the tube by means of respective actuators 60 which are controlled in accordance with data from the probes 57 so that the ride height of the cutter jets 59 is continuously adjusted in accordance with the contour of the tube 10.

At one end, the machine 50 includes a rotatable head 61 which is capable of releasable connection to the adjacent end of tube 10 in such a manner that the tube can be rotated about its longitudinal axis.

In use, the tube 10 is positioned on the supports 52 and coupled to the rotatable head 61. The sub-carriage 54 is set to a "zero" position longitudinally of the main carriage 53 and the main carriage itself is positioned at the end of the machine adjacent to the rotatable head 61. The datum points of the tube 10 in place are then established. This is achieved by firstly operating the rotatable head 61 to align one of the locking plunger holes 26 with the angular datum position $D_\alpha$. The main carriage 53 is then advanced along the rails to bring the cutterjets 59 accurately into line with the end 24 of the tube and establish datum point $D_1$. The main carriage 53 is then moved until the cutter jets are advanced to the center of the butt weld forming the joint 16 to define datum point $D_2$, advanced to align the cutterjets with the side face of the flange 42 nearest the end 24 of the tube to establish datum point $D_3$, advanced further to bring the cutter jets to the center of the butt weld forming the joint 19 and establish datum point $D_4$, and finally to bring the cutter jets into register with the opposite end 34 of the tube 10 to establish datum $D_5$. The rotation head 61 is then operated to bring the nearest of the recesses 36 to the angular datum point $D_\alpha$ and thereby establish any angular offset between the two ends of the tube.

From the established datum values, and the parameters of the positionally fixed slots which are predetermined by the known sizes of the machined components 11, 13 and 15, the required slot pattern for the tubular elements 12 and 14 is computed and cutting is commenced from the end of the machine furthest from the rotatable head 61.

The sequence of cutting operations is as follows. Firstly, the sub-carriage 54 is centered relative to the tube 10, and the cutter jets are set to the required height above the outer surface of the tube. The cutter jets are then brought into operation and the sub-carriage 54 on which they are mounted is moved longitudinally relative to the main carriage 53 through a distance corresponding to the desired length of the first row of slots. With the main carriage 53 remaining in the same position, the sub-carriage 54 is returned to its starting point, whilst the cutting jets are inoperative, and the rotatable head 61 is moved through the required angular distance so that the points at which the next four slots are to be cut then register with the cutter jets. This operation is repeated, four times in the case of the illustrated embodiment, until a complete ring of slots is formed, whereupon the main carriage 53 is advanced by the distance necessary to bring the cutter jets to the position at which the next ring of slots is to be cut, with the defined overlap $\underline{d}^0$, and the cutting sequence is repeated in this way throughout the whole length of the tube 10. At the beginning of each cutting cycle readings from the probes 54 are used to detect deviations in the longitudinal centreline of the tube from the ideal straight line axis, and any deviations in the shape of the exterior surface of the tubular elements from the ideal true circle. This data is used to adjust the parameters of the positionally variable slots in real-time as the cutter jets are advanced. The cutter jets themselves are also moved automatically in the radial direction so as to maintain the optimum spacing from the external surface of the tube at all points along its length.

In this way, the desire value of overlap $\underline{d}^0$ is achieved despite variations in the overall length of one tube as compared with another due to the tolerances on the butt welds, and additionally, the angular spacing of the slots is varied as necessary within, and between, each ring of positionally variable slots in order to compensate for local deviations of the longitudinal axis of the tube and/or circularity.

The invention claimed is:

1. A method of manufacturing an expandable tubular comprising:
   providing a tubular;
   measuring a parameter of the tubular; and
   at least one of:
      compensating a desired pattern of apertures using the measured parameter to account for a manufacturing tolerance of the tubular; and forming apertures in the wall of the tubular according to the compensated pattern; and
      forming the apertures in the wall of the tubular according to the desired pattern while utilizing the measured parameter to compensate the desired pattern for the manufacturing tolerance of the tubular.

2. A method of implementing an expandable tubular, comprising:
   manufacturing the expandable tubular according to claim 1:
   inserting the tubular into a weilbore; and
   radially expanding the tubular.

3. The method of claim 1, wherein the desired or compensated pattern of apertures extend axially along the periphery of the tubular.

4. The method of claim 3, wherein the forming of the desired or compensated pattern of apertures on the tubular is carried out by commencing the forming of said apertures from one end of the tubular to form said apertures progressively along the entire length of the tubular.

5. The method of claim 3, wherein the desired or compensated pattern of apertures is formed at a uniform angular spacing around the periphery of the tubular.

6. The method of claim 1, wherein providing the tubular comprises providing a tubular assembly, comprising:
   the tubular; and
   tubular couplings having preformed apertures, each tubular coupling welded to a respective end of the tubular.

7. A method of implementing an expandable tubular assembly comprising:
   manufacturing the expandable tubular assembly according to claim 6:
   inserting the expandable tubular assembly in a wellbore; and
   plastically expanding the outer diameter of the expandable tubular assembly.

8. The method of claim 6, wherein:
   the act of measuring comprises measuring an angular offset between two ends of the tubular couplings.

9. The method of claim 6, wherein:
the method comprises the acts of compensating the desired pattern of apertures using the measured parameter to account for the manufacturing tolerance of the tubular; and forming the apertures in the wall of the tubular according to the compensated pattern, and the act of compensating comprises calculating the desired pattern of apertures using the measured parameter to ensure that the desired or compensated pattern of apertures:
extends across joints between the couplings and the tubular,
is longitudinally centered on the joints across which it extends, and
has a length of overlap between apertures of the desired pattern that is uniform.

10. The method of claim 6, wherein:
the act of measuring comprises establishing datum at each end of the tubular assembly and at a centerline of one of the welds.

11. The method of claim 1, wherein:
the act of measuring comprises monitoring the position of the local center-line of the tubular.

12. The method of claim 1, further comprising:
providing a carriage movable through a succession of working positions along the tubular;
disposing an aperture cutter on the carriage
moving the carriage through the succession of working positions, wherein a sub-method is performed at each working positions, comprising:
performing the forming act using the aperture cutter;
rotationally indexing the tubular; and
repeating the performing and indexing acts until all the required apertures are formed at each of the working positions.

13. The method of claim 12, wherein:
the disposing act comprises disposing a sub-carriage comprising a plurality of aperture cutters on the carriage, and
the performing act comprises:
moving the sub-carriage along a second longitudinal axis substantially parallel to a longitudinal axis of the tubular from a starting position while the aperture cutters are operated to cut apertures of a pre-determined dimension, and
returning the sub-carriage to the starting position.

14. The method of claim 13, wherein, for each aperture cutter, the sub-carriage further comprises:
an actuator configured to move a respective cutter radially with respect to the tubular; and
a probe disposed on the sub-carriage so that the probe may measure the parameters of a portion of the tubular before the respective cutter forms a respective aperture in that portion of the tubular.

15. The method of claim 13, wherein:
the sub-carriage is disposed on the carriage for movement relative there to on two transverse axes relative to the longitudinal axis of the tubular, and
the sub-method further comprises centering the sub-carriage relative to the longitudinal axis of the tubular.

16. The method of claim 1, wherein the tubular is made from metal.

17. The method of claim 1, wherein the apertures are slots.

18. The method of claim 1, wherein:
the act of measuring comprises monitoring a shape of an exterior surface of the tubular.

19. The method of claim 1, wherein:
the method comprises the acts of compensating the desired pattern of apertures using the measured parameter to account for the manufacturing tolerance of the tubular; and forming the apertures in the wall of the tubular according to the compensated pattern.

20. The method of claim 1, wherein:
the method comprises the act of forming the apertures in the wall of the tubular according to the desired pattern while utilizing the measured parameter to compensate the desired pattern for the manufacturing tolerance of the tubular.

21. A method of manufacturing and implementing an expandable tubular comprising:
providing a tubular;
measuring an angular offset between two ends of the tubular;
calculating a desired pattern of apertures to be cut in accordance with the angular offset of the tubular; and
forming apertures in the wall of the tubular according to the desired pattern while utilizing the measured parameters to account for manufacturing variations of the tubular.

22. The method of claim 21, wherein:
providing a tubular comprises providing a tubular having couplings which have pre-formed apertures,
the act of calculating comprises calculating the desired pattern of apertures using the measured parameters as to ensure that the desired pattern of apertures:
extends across joints between the couplings and the tubular,
is longitudinally centered on the joints across which it extends, and
has a length of overlap between apertures of the desired pattern, including the joint-crossing apertures, that is uniform.

23. The method of claim 21, wherein the apertures are slots.

24. A method of manufacturing an expandable tubular comprising:
providing a tubular;
calculating a desired pattern of apertures;
monitoring the position of the local center-line of the tubular; and
recalculating the desired pattern of apertures to account for local deviations in the position of the center-line while forming apertures in the tubular in accordance with the recalculated pattern.

25. The method of claim 24, wherein the apertures are slots.

* * * * *

UNITED STATES PATENT AND TRADEMARK OFFICE
CERTIFICATE OF CORRECTION

PATENT NO. : 7,255,171 B2
APPLICATION NO. : 11/181294
DATED : August 14, 2007
INVENTOR(S) : Wayne Rudd It is certified that error appears in the above-identified patent and that said Letters Patent is hereby corrected as shown below:

In the Claims:

Column 10, Claim 1, Line 22, after "comprising", please insert --acts of--;

Column 10, Claim 1, Line 28, after "forming", please insert --the--;

Column 10, Claim 3, Line 42, please delete "the" and insert --a--;

Column 10, Claim 4, Line 44, after "wherein" please insert --each of--, after "forming" please insert --acts--, and delete "of the";

Column 10, Claim 4, Lines 45-46, please delete "desired or compensated pattern of apertures on the tubular is carried out by commencing the", before "forming" insert --comprises--, after "forming" delete "of said", and before "apertures" insert --the--;

Column 10, Claim 4, Line 47, please delete "to form said apertures";

Column 10, Claim 4, Line 48, after "along", please delete "the" and insert --an--;

Column 10, Claim 7, Line 63, after "expanding", please delete "the" and insert --an--;

Column 11, Claim 9, Line 2, please delete "acts" and insert --act--;

Column 11, Claim 9, Lines 7-10, after "the", please delete "act of compensating comprises calculating the desired pattern of apertures using the measured parameter to ensure that the desired or", and after "pattern", delete "of apertures";

Column 11, Claim 9, Lines 13-14, please delete "across which it extends";

Column 11, Claim 9, Lines 15-16, after "between", please insert --the--, and delete "of the desired pattern that is uniform";

Column 11, Claim 10, Line 18, after "establishing", please insert --a--;

Column 11, Claim 11, Line 23, before "local", please delete "the" and insert --a--;

Column 11, Claim 12, Line 24, after "comprising", please insert --acts of--;

UNITED STATES PATENT AND TRADEMARK OFFICE
CERTIFICATE OF CORRECTION

| | | |
|---|---|---|
| PATENT NO. | : 7,255,171 B2 | |
| APPLICATION NO. | : 11/181294 | |
| DATED | : August 14, 2007 | |
| INVENTOR(S) | : Wayne Rudd | |

It is certified that error appears in the above-identified patent and that said Letters Patent is hereby corrected as shown below:

Column 11, Claim 12, Line 30, please delete "positions" and insert --position--, and after "comprising", please insert --acts of--;

Column 11, Claim 12, Lines 33-35, after "acts", please delete "until all the required apertures are formed at each of the working positions";

Column 11, Claim 14, Line 52, please delete "parameters" and insert --parameter--;

Column 11, Claim 15, Line 57, please delete "there to" and insert --thereto--;

Column 12, Claim 21, Line 20, after "comprising", please insert --acts of--;

Column 12, Claim 21, Lines 27-28, please delete "parameters", and insert --offset--;

Column 12, Claim 22, Line 31, please delete "providing a tubular comprises providing a", before "tubular" insert --the--, and after "tubular" delete "having" and insert --has--;

Column 12, Claim 22, Lines 33-35, after "the", please delete "act of calculating comprises calculating the desired pattern of apertures using the measured parameters as to ensure that the", and after "pattern", please delete "of apertures";

Column 12, Claim 22, Lines 38-39, please delete "across which it extends";

Column 12, Claim 22, Lines 40-41, after "between", please insert --the--, and delete "of the desired pattern";

UNITED STATES PATENT AND TRADEMARK OFFICE
CERTIFICATE OF CORRECTION

PATENT NO. : 7,255,171 B2
APPLICATION NO. : 11/181294
DATED : August 14, 2007
INVENTOR(S) : Wayne Rudd It is certified that error appears in the above-identified patent and that said Letters Patent is hereby corrected as shown below:

Column 12, Claim 24, Line 51, after "monitoring", delete "the" and insert --a--, and after "position of", delete "the" and insert --a--.

Signed and Sealed this

Twenty-fourth Day of June, 2008

JON W. DUDAS
*Director of the United States Patent and Trademark Office*